Aug. 3, 1971     E. L. PITYO     3,597,184
REED SWITCH GAPPING MECHANISM
Filed Jan. 2, 1969     2 Sheets-Sheet 1
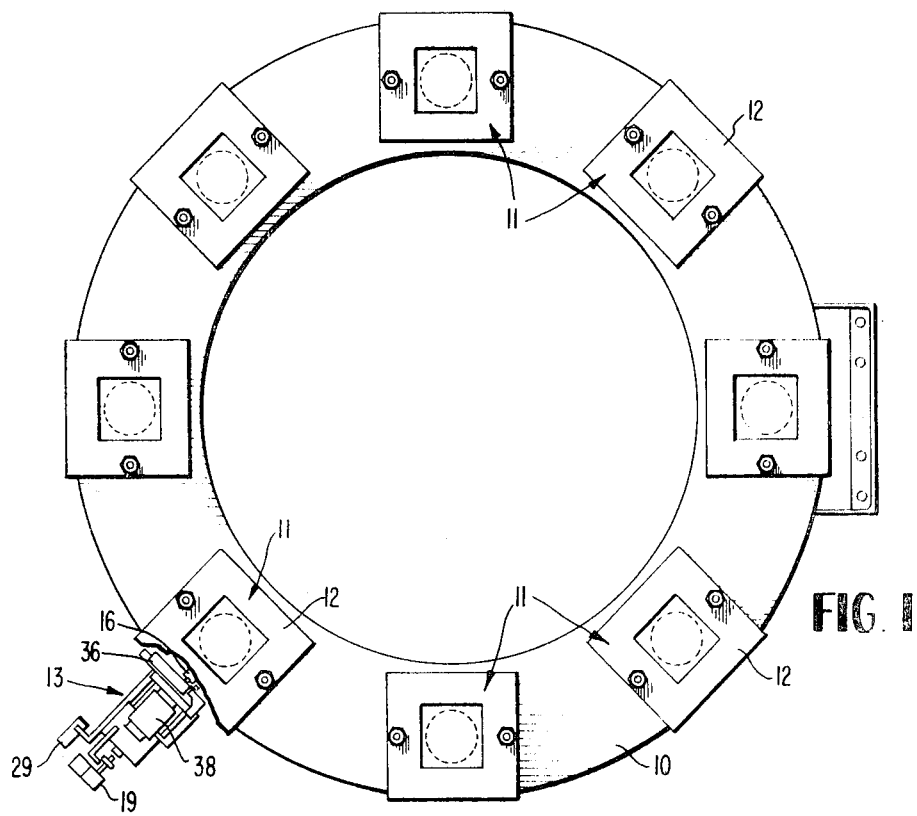
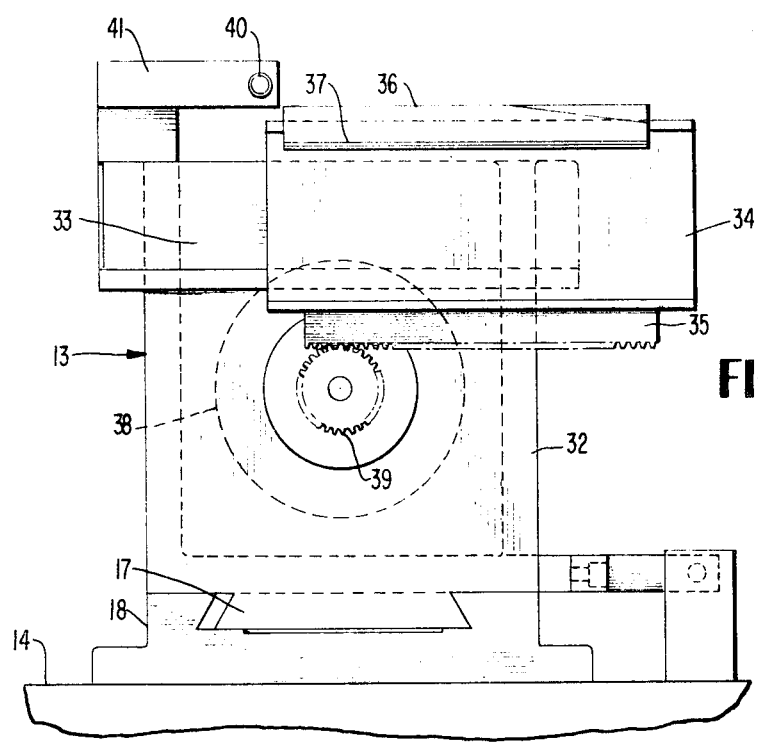
INVENTOR
E. L. PITYO
BY B. P. Fishburn Jr.
ATTORNEY United States Patent Office 3,597,184
Patented Aug. 3, 1971

3,597,184
REED SWITCH GAPPING MECHANISM
Edward L. Pityo, Cedar Grove, N.J., assignor to Federal
Tool Engineering Co., Cedar Grove, N.J.
Filed Jan. 2, 1969, Ser. No. 788,565
The portion of the term of the patent subsequent to
Aug. 12, 1986, has been disclaimed
Int. Cl. C03b 27/02, 29/00
U.S. Cl. 65—154                                        6 Claims

ABSTRACT OF THE DISCLOSURE

A mechanism for consistently establishing with great accuracy the gap between the reed elements of magnetic reed switches as the switches are manufactured step-by-step by an indexable turret apparatus carrying plural sealing heads. The gapping mechanism compensates automatically for thermal expansion or contraction of the turret and associated elements.

CROSS-REFERENCE TO RELATED APPLICATION

This application contains some subject matter in common with prior copending application Ser. No. 644,714, filed June 8, 1967, for Method of and Apparatus for Producing Magnetic Reed Switches, now U.S. Pat. 3,537,276.

In accordance with the invention in said prior application, a fabricating head for magnetic reed switches is provided including upper and lower adjustable reed holding jaws nad back reflectors for radiant energy heating sources employed for producing the upper and lower seals during the manufacturing process. The process involves the initial positioning and holding of a glass envelope by holding jaws into overlapping relation with the lower reed ment of the envelope over the lower reed as such reed is being held. Following this, the upper reed is moved by its holding jaws into ovrlapping relation with the lower reed inside of the glass envelope and the upper reed is sealed within the envelope by utilizing the radiant heating and back reflectors. Following this, the reeds are gapped by shifting the lower reed holding jaws in response to the wiping movement of a sine bar across a contact rib forming a part of the lower jaw unit. Following this, the lower reed is sealed to the glass envelope and the switch is essentially completed and ready for ejection from the apparatus The above invention in said prior application and the sealing head embodied therein is in the nature of a bench unit or a single station unit.

Subsequently, the sealing head apparatus essentially as disclosed in said prior application has been utilized in the form of plural units or heads mounted in circumferentially spaced relation on an indexable ring type turret which moves the several heads in a step and dwell manner to plural work stations around the circumference of the turret where the various processing steps enumerated above are carried out in a much more expeditious and efficient manner resulting in much higher production.

With the turret machine, a problem has been encountered caused by thermal expansion of the indexable ring or turret during the heat sealing of the reeds within the glass envelopes. The several heads mounted on the indexable ring are initially set up and adjusted while cold and after the machine operates for a relatively short time period, the heat caused by the radiant sealing lamps causes expansion of the apparatus sufficiently to produce serious errors in the gap of the reed switches which is quite critical and must be held within close limits.

In light of the above, the primary objective of the invention herein is to completely solve and eliminate the thermal expansion problem inherent in the turret machine through the provision of an improved mechanism for gapping the switches at the gapping station. By the provision on the gapping mechanism of a positive stop element for engagement with an adjustable screw stop on the sealing head or, in some instances, on the turret ring, the critical relation between the contact rib of the lower reed holding jaws ad the sine bar whose movement across the rib establishes the final size of the gap will always be the same regardless of the degree of thermal expansion or contraction of the turret ring. Additionally, the gapping mechanism includes improved means for shifting a main slide carrying the sine bar mechanism radially toward the sealing head and step motor means to drive a linear slide upon which the sine bar is mounted a precise distance for establishing the reed gap with great accuracy.

BRIEF DESCRIPTION OF THE DRAWINGS

FIG. 1 is a partly diagrammatic plan view of a reed switch manufacturing apparatus of the turret type showing the gapping station mechanism and omitting components at other work stations for simplicity.

FIG. 4 is a fragmentary end elevational view of the gapping mechainism shown in FIGS. 2 and 3.

DESCRIPTION OF THE PREFERRED EMBODIMENT

Figure 2:
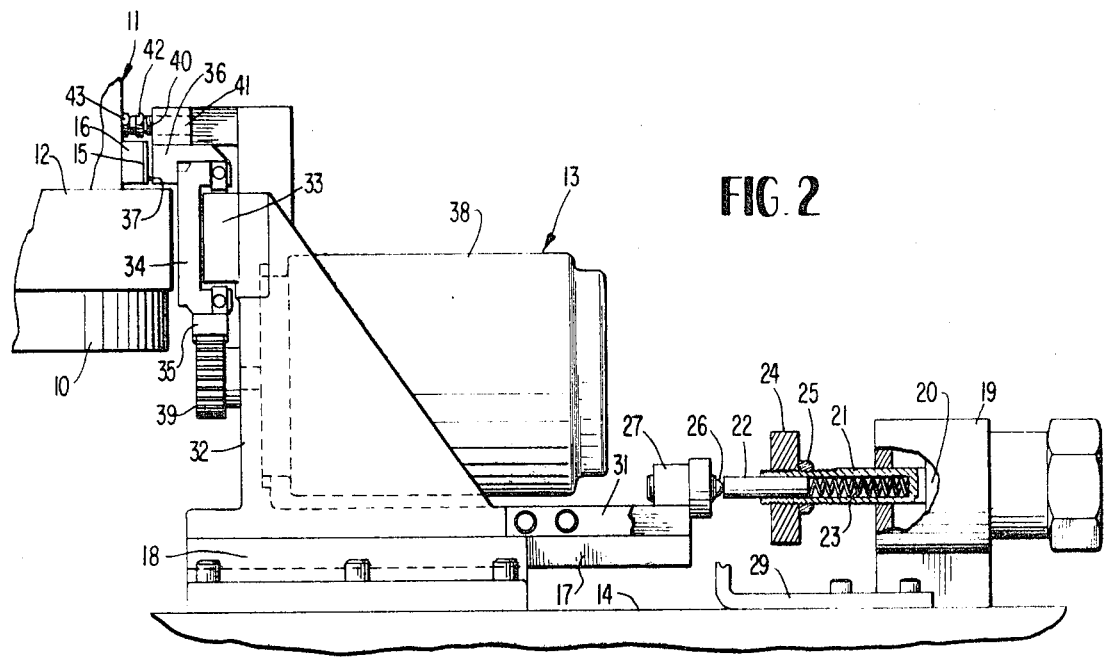
FIG. 2 is a fragmentary side elevation, partly in section, of the gapping station mechanism and the associated portion of the turret apparatus.

Referring to the drawings in detail, wherein like numerals designate like parts, the numeral 10 designates an indexable turret ring or table which is indexed in a step and dwell manner by known means which need not be described for a proper understanding of this invention. The indexable ring 10 has mounted thereon in circumferentially spaced relation reed switch fabricating or sealing heads 11 essentially of the type disclosed in said prior application Ser. No. 644,714 now Pat. 3,537,376. Each head 11 has a base 12 securely bolted to the ring 10 for indexing movement therewith. FIG. 1 for illustrative purposes only shows seven of the heads 11, and this number may vary and as many as fourteen heads are employed in practice. Also in FIG. 1, setting mechanism forming the main subject matter of the invention is indicated in its entirety at 13 and this same mechanism is shown in detail in FIGS. 2 to 4 of the drawings. As shown in these figures, the mechanism 13 is stationary relative to the indexing ring 10 and is mounted on any suitable stationary support or table 14 beyond the periphery of the ring.

Figure 3:
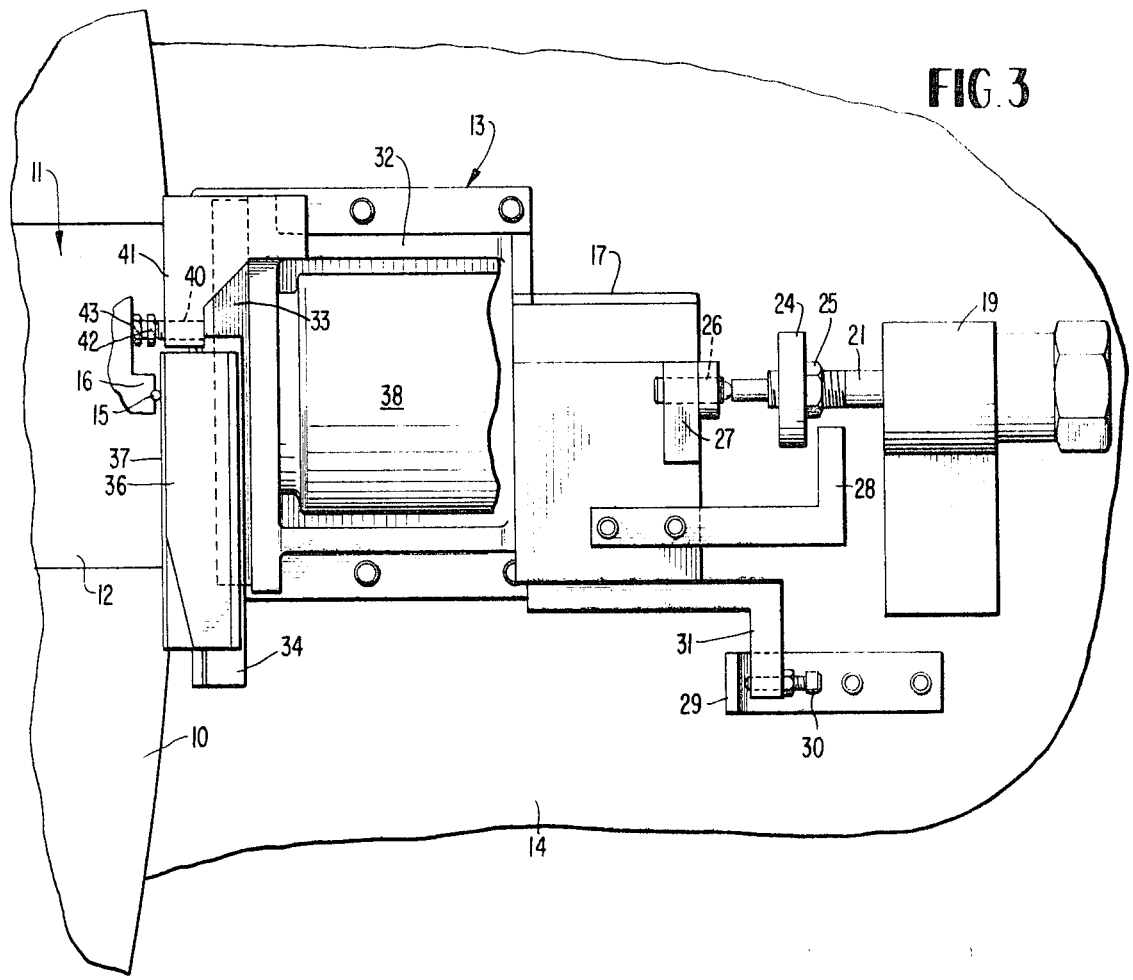
FIG. 3 is a plan view of the apparatus in FIG. 2.

As shown in FIGS. 2 and 3, a fragmentary portion of one of the reed switch sealing heads 11 is shown during its dwell adjacent the gapping mechanism 13. The head 11 carries an accurately ground vertical hard steel contact rib 15 on an extension 16 of the lower jaw assembly of the head 11 which holds the lower reed element, not shown, to be accurately gapped with the upper reed element, generally as disclosed in said prior application.

The mechanism 13 which cooperates with the contact rib 15 of the sealing head comprises the following. A main slide 17 extends radially beyond the ring 10 at a somewhat lower elevation than the ring, FIG. 2, and is mounted in a sturdy fixed guide 18, rigidly secured to the fixed support 14. The main slide 17 is shifted radially by means of an air operated cylinder 19 connected with any convenient source and having a piston 20 therein whose rod 21 is made tubular for containing a slide plunger 22 backed up by a compression spring 23 in the tubular piston rod. An external collar or ring 24 having a locking nut 25 is adjustably mounted on the exterior of the rod 21 for a purpose to be described. The spring urged plunger 22 is adapted to contact a pin element 26 of hardened steel held adjustably in a lug 27 rigid with the slide 17. An L-member 28 secured rigidly to the main slide 17, FIG. 3, engages behind or outwardly of the collar 24 so that retraction of the piston 20 radially outwardly will return the main slide outwardly or away from the ring 10. A stop bracket 29 fixed to the support 14 positively limits the movement of the slide 17 toward the ring 10 due to contact with an adjustable screw stop 30 carried by another L-bracket 31 fixedly secured to one side of the main slide 17.

A rigid upstanding support casting or member 32 is secured to or forms a part of the main slide 17 and this casting carries at its top, near the elevation of the ring 10, a transverse horizontal guide 33 for a coacting linear slide or carriage 34 having a horizontal toothed rack bar 35 affixed to its lower side. The linear slide 34 is adapted to move substantially at a tangent to the ring 10 and, more particularly, to the upstanding contact rib 15 of the lower reed holding jaw assembly of the head 11. The linear slide 34 has mounted thereon a sine bar 36 whose longitudinal camming lip 37 is at the proper elevation to engage the contact rib 15 for precisely establishing the required gap between the two reeds of each switch being fabricated.

The lip 37 of the sine bar is accurately machined at a slight angle whereby linear movement of the sine bar with the slide 34 will slightly displace the contact rib 15 radially inwardly and consequently will move the lower jaws of the head 11 which are holding the lower reed element.

The carriage 34 and sine bar are displaced by an electrical stepping motor 38, suitably mounted on the support or casting 32 and having an output gear 39 in mesh with the teeth of rack bar 35 at all times. The activation and de-activation of the stepping motor is under control of circuitry, not shown herein. The arrangement is such that 1/20 of one revolution of the stepping motor shaft and gear 39 and the resultant linear displacement of the sine bar 36 causes .00005 inch radial displacement of the contact rib 15 and consequently this amount of movement of the lower reed, not shown. One complete revolution of the stepping motor shaft equals .001 inch of radial displacement for the contact rib 15 by means of the sine bar lip 37 which wipes across the contact rib. When the stepping motor 38 has caused the proper linear displacement of the sine bar 36 to establish the required reed switch gapping, the stepping motor returns automatically with the sine bar to the "home" position through the operation of the control circuitry. This type of stepping motor and its electrical controls are conventional and well known in the art.

A very important feature of the mechanism resides in the provision of a fixed or unchanging initial reference means for the gapping mechanism which will insure the same accurate gapping of reed switches regardless of thermal expansion of the turret ring 10 as caused by the heating lamps. This fixed reference means comprises a hardened stop pin 40 mounted in a rigid bracket extension 41 on the top of support casting 32 and projecting over the sine bar 36, as shown in FIGS. 2 and 4. A coating adjustable screw stop 42 on each sealing head 11 having a locking nut 43 contacts the stop element 40 when the piston 20 initially moves the main slide 17 forwardly or radially toward the head 11. When the screw stop 42 is properly adjusted, an accurate reference point will be established regardless of changes in the ring 11 and associated elements caused by heat. Piston 20 will advance the main slide 17 and all parts mounted thereon until the stop element 40 contacts the screw stop 42, as shown. Continued forward movement of the piston 20 will cause compression of the spring 23 and retraction of the plunger 22 into the bore of piston rod 21 so that the slide 17 will not be overloaded and will be properly set or positioned for the sine bar 36 to gap the head switch when the stepping motor 38 is activated.

After the gapping operation is completed, the piston 20 is retracted and the collar 24 will engage the element 28 and return the main slide 17 radially outwardly or away from the ring 10 so that the next head 11 on the ring 10 may be indexed to the gapping station where the cycle of operation is again repeated by the piston 20 again pushing the main slide 17 forwardly until the elements 40 and 42 are in contact.

It may now be seen that an extremely simplified and highly accurate method of gapping reed switches is provided, independent of the thermal stability of the indexing apparatus, and through the stepping motor control of sine bar displacement extremely minute radial displacements of the reed holding jaw means 16 may be produced. The results will always be the same regarding the critical gapping of the switches as each head 11 in turn presents itself to the gapping station where the mechanism 13 is situated.

The various advantages of the gapping mechanism should be readily apparent to those skilled in the art without further description.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A reed switch gapping mechanism particularly for use with a reed switch sealing head carried by a turret which is subject to dimensional change due to thermal expansion and contraction, said sealing head including reed holding jaw means having a contact element adapted to be engaged and minutely displaced in a reed gapping operation, said mechanism comprising a stationary support (14) unattached to said turret, a main linear slide (17) mounted on the stationary support for movement toward and away from a reed switch sealing head (11) on the turret, a power means (19)–(20) to advance and retract the main slide including a one-way active yielding connection (22), (23), (26) with the main slide which prevents the power means from overloading the main slide when driving it toward said reed switch sealing head, an adjustable interengaging rigid stop means (40)–(42) including parts on the main slide and on said sealing head, said rigid stop means establishing a non-varying reference contact position for the gapping mechanism with the reed switch sealing head upon which the gapping mechanism is acting, a guide element (33) mounted on the main slide substantially at right angles to the linear path of movement of the main slide, a carriage (34) engaging the guide element and movable thereon across the path of movement of the main slide, a sine bar gapping member (36) secured to the carriage and movable bodily therewith and having a gradually angled camming face adapted to engage said contact element (15) of said reed switch sealing head and to wipe across the element to minutely displace it for accurate gapping of switch reeds independent of thermal expansion or contraction of said turret (10), and a stepping motor means (38) on the main slide connected with and driving the carriage and sine bar through prescribed distances longitudinally of said guide element (33).

2. The structure of claim 1, in said power means (19)–(20) comprising an extensible and retractable cylinder-piston unit on the stationary support (14), said one-way active yielding connection including a piston rod (21) for the piston of said unit, and said piston rod comprising telescoping parts (21)–(22) and a spring (23) serving to extend said parts axially, one part (22) of the piston rod bearing on said main linear slide (17) to push the same yieldingly toward said reed switch sealing head (11) to maintain said rigid stop means (40)–(42) in contact during all dimensional variations of said turret (10).

3. The structure of claim 2, and an upstanding support bracket (32) on the main slide (17) movable therewith, said guide element (33) and carriage (34) mounted near the top of the support bracket (32) and above the elevation of the main slide (17), said stepping motor means comprising a stepping motor (38) mounted on the support bracket and having an output gear (39) at its forward end below said carriage (34), and a rack bar (35) on the bottom of the carriage in mesh with the output gear.

4. The structure of claim 3, and said part of the rigid stop means on the main slide including an upper forward projection (41) on the upstanding support bracket (32) arranged so that said part (40) extends forwardly of the angled face (37) of said sine bar.

5. The structure of claim 4, and said rigid stop means (40)–(42) being adjustable and including a screw stop.

6. The structure of claim 5, and an adjustable collar element (24) on said piston rod (21), and an abutment (29) on said main slide (17) engaged by the collar element during retraction of the cylinder-piston unit to retract the main slide.

References Cited

UNITED STATES PATENTS

| | | | |
|---|---|---|---|
| 2,697,307 | 12/1954 | Diehl et al. | 65—154 |
| 2,882,648 | 4/1959 | Hovgaard et al. | 65—32 |
| 2,984,046 | 5/1961 | Brewer et al. | 65—154 |
| 3,155,478 | 11/1964 | O'Brien | 65—155X |
| 3,273,989 | 9/1966 | Gubitose et al. | 65—155X |
| 3,369,291 | 2/1968 | Shaffer, Jr., et al. | 65—155X |
| 3,421,874 | 1/1969 | Chanowitz | 65—155 |
| 3,432,282 | 3/1969 | Schulz | 65—155 |

FRANK W. MIGA, Primary Examiner

U.S. Cl. X.R.

65—59, 155, 158